(12) United States Patent
Umetsu

(10) Patent No.: US 6,870,715 B2
(45) Date of Patent: Mar. 22, 2005

(54) SPIN VALVE MAGNETORESISTIVE HEAD HAVING A FREE LAYER CONTACTED AT EACH END BY A FERROMAGNETIC LAYER OF A BIAS LAYER

(75) Inventor: Eiji Umetsu, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 224 days.

(21) Appl. No.: 09/960,679

(22) Filed: Sep. 21, 2001

(65) Prior Publication Data

US 2002/0036878 A1 Mar. 28, 2002

(30) Foreign Application Priority Data

Sep. 26, 2000 (JP) ....................................... 2000-297076

(51) Int. Cl.⁷ .............................................. G11B 5/39
(52) U.S. Cl. ................................................ 360/324.12
(58) Field of Search ........................ 360/324.1, 324.11, 360/324.12, 324.2

(56) References Cited

U.S. PATENT DOCUMENTS

| | | | |
|---|---|---|---|
| 5,768,067 A | | 6/1998 | Saito et al. |
| 5,784,225 A | | 7/1998 | Saito et al. |
| 6,157,526 A | * | 12/2000 | Watanabe et al. ...... 360/324.12 |
| 6,185,078 B1 | * | 2/2001 | Lin et al. ............... 360/324.12 |
| 6,266,218 B1 | * | 7/2001 | Carey et al. ........... 360/324.12 |
| 6,295,186 B1 | * | 9/2001 | Hasegawa et al. ..... 360/324.11 |
| 6,381,107 B1 | * | 4/2002 | Redon et al. ............ 360/324.2 |
| 6,466,418 B1 | * | 10/2002 | Horng et al. .......... 360/324.12 |
| 6,545,848 B1 | * | 4/2003 | Terunuma ............. 360/324.12 |
| 6,556,391 B1 | * | 4/2003 | Aoshima et al. ....... 360/324.12 |

FOREIGN PATENT DOCUMENTS

| | | |
|---|---|---|
| JP | 7-57223 | 3/1995 |
| JP | 11-134619 | 5/1999 |
| JP | 2000-215422 | 8/2000 |

* cited by examiner

Primary Examiner—Jefferson Evans
(74) Attorney, Agent, or Firm—Brinks Hofer Gilson & Lione

(57) ABSTRACT

A magnetoresistive element exhibiting good external magnetic field detection characteristics is provided. The magnetoresistive element includes a laminate comprising a nonmagnetic conductive layer, first and second ferromagnetic layer sandwiching the nonmagnetic conductive layer, and a first antiferromagnetic layer for pinning the magnetization direction of the first ferromagnetic layer, deposited on the face of the first ferromagnetic layer opposite the face in contact with the nonmagnetic conductive layer. Bias layers for applying a bias magnetic field to the second ferromagnetic layer are provided respectively on two ends of the laminate. Each bias layer comprises second and third antiferromagnetic layers and a third ferromagnetic layer sandwiched by the second and third antiferromagnetic layers so as to magnetically couple with the second and third antiferromagnetic layer. Two end faces of the second ferromagnetic layer come into contact with the third ferromagnetic layers.

3 Claims, 4 Drawing Sheets

SPIN VALVE MAGNETORESISTIVE HEAD HAVING A FREE LAYER CONTACTED AT EACH END BY A FERROMAGNETIC LAYER OF A BIAS LAYER

BACKGROUND OF THE INVENTION

1. Field of the Invention

The present invention relates generally to magnetoresistive elements for use in magnetic heads and, more particularly, to a magnetoresistive element utilizing the spin valve effect.

2. Description of the Related Art

FIG. 3 is an illustration of a conventional magnetoresistive element 21 of a spin-valve type. The magnetoresistive element 21 includes a laminate 30 formed on an underlayer 29 composed of a nonmagnetic material such as tantalum, the laminate 30 comprising: an antiferromagnetic layer 22 composed of a PtMn alloy and the like; a first ferromagnetic layer 23 composed of a CoFe alloy and the like; a nonmagnetic conductive layer 24 composed of Cu and the like; and a second ferromagnetic layer 25 composed of an FeNi alloy and the like, deposited on the underlayer 29 in that order. A protective layer 31 composed of a nonmagnetic material such as tantalum is deposited on the laminate 30, and a bias layer 32 comprising a third ferromagnetic layer 26 composed of an FeNi alloy and the like and an antiferromagnetic layer 27 composed of a PtMn alloy and the like deposited in that order is disposed on each of two ends of the laminate 30. An electrode layer 28 composed of Au and the like is deposited on each bias layer 32.

The magnetization direction of the first ferromagnetic layer 23 is pinned in the Y direction in the drawing, i.e., the direction into the plane of the drawing of FIG. 3, as a result of exchange coupling occurring at the interface between the first ferromagnetic layer 23 and the antiferromagnetic layer 22.

The magnetization direction of the third ferromagnetic layer 26 is pinned in the X direction in the drawing as a result of exchange coupling occurring at the interface between the third ferromagnetic layer 26 and the antiferromagnetic layer 27. The magnetization direction of the second ferromagnetic layer 25 is oriented in the direction substantially perpendicular to the magnetization direction of the first ferromagnetic layer 23, i.e., in the X direction in the drawing, as a result of ferromagnetic coupling (magnetic coupling) between the third ferromagnetic layer 26 and the second ferromagnetic layer 25. In other words, a bias magnetic field is applied to the second ferromagnetic layer 25 from the third ferromagnetic layer 26 constituting the bias layer 32.

The magnetoresistive element 21 having the above structure is applied to, for example, a magnetic head incorporated in a magnetic disk device. While supplying a sense current to the first ferromagnetic layer 23, the nonmagnetic conductive layer 24, and the second ferromagnetic layer 25 from the electrode layer 28 via the bias layer 32, a track width region indicated by Tw is positioned to a desired track on a magnetic disk rotating in the Z direction in the drawing. When a leakage magnetic field from the desired track is applied as an external magnetic field in the Y direction in the drawing, the magnetization direction of the second ferromagnetic layer 25 shifts from the X direction in the drawing toward the Y direction in the drawing.

Such a change in the magnetization direction of the second ferromagnetic layer 25 in relation to the magnetization direction of the first ferromagnetic layer 23 causes the electrical resistance in the magnetoresistive element 21 to change. The leakage magnetic field from the desired track is then detected as the change in voltage resulting from the change in resistance. Thus, the magnetoresistive element 21 can read the information recorded on the desired track.

In the conventional magnetoresistive element 21 described above, the magnetization direction of the third ferromagnetic layer 26 pinned in the X direction in the drawing as a result of magnetic coupling with the antiferromagnetic layer 27 may be changed due to a leakage magnetic field from the track adjacent to the desired track on the magnetic disk. Such change in the magnetization direction of the third ferromagnetic layer 26 adversely affects detection characteristics of the leakage magnetic field from the desired track, resulting in inability to accurately read the information recorded on the desired track.

Such disadvantages can be overcome by reducing the thickness of the third ferromagnetic layer 26 and increasing the strength of the magnetic coupling between the third ferromagnetic layer 26 and the antiferromagnetic layer 27. However, in such a case, a sufficient bias magnetic field can no longer be applied to the second ferromagnetic layer 25 due to the decrease in the leakage magnetic field from the third ferromagnetic layer 26, and the magnetization direction of the second ferromagnetic layer 25 cannot be aligned in the X direction in the drawing.

Another possible structure is, as has been known in the art, to replace the bias layer 32 with a permanent magnetic layer 33 made of a CoPt alloy and the like and to apply a leakage magnetic field from the permanent magnetic layer 33 to the second ferromagnetic layer 25 as a bias magnetic field for orienting the magnetization direction of the second ferromagnetic layer 25 in the X direction in the drawing. In this structure, however, the magnetization direction of the portion of the second ferromagnetic layer 25 in contact with the permanent magnetic layer 33 is inhibited from changing freely, resulting in degradation in the detection characteristics of the leakage magnetic field from the desired track.

SUMMARY OF THE INVENTION

In view of the above, it is an object of the present invention to provide a magnetoresistive element having bias layers capable of generating a sufficient bias magnetic field and exhibiting good external magnetic field detection characteristics.

In order to achieve the above object, the present invention provides a magnetoresistive element comprising: a laminate comprising a nonmagnetic conductive layer, a first ferromagnetic layer formed on one face of the nonmagnetic conductive layer, a second ferromagnetic layer formed on the other face of the nonmagnetic conductive layer, and a first antiferromagnetic layer for pinning the magnetization direction of the first ferromagnetic layer. The first antiferromagnetic layer is formed on the face of the first ferromagnetic layer opposite the face in contact with the nonmagnetic conductive layer. The magnetoresistive element also comprises bias layers for applying a bias magnetic field to the second ferromagnetic layer in order to orient the magnetization direction of the second ferromagnetic layer in a direction substantially orthogonal to the magnetization direction of the first ferromagnetic layer. The bias layers are respectively disposed on the two ends of the laminate. Each bias layer comprises second and third antiferromagnetic layers arranged to oppose each other and a third ferromagnetic layer for generating the bias magnetic field by magnetically coupling to the second and the third antiferromagnetic layers. The third ferromagnetic layer is disposed between the second and third antiferromagnetic layers.

The order of deposition of the layers constituting the above-described laminate may be the first antiferromagnetic layer, the first ferromagnetic layer, the nonmagnetic conductive layer, and the second ferromagnetic layer. The order of deposition of layers constituting the above-described each bias layer may be the second antiferromagnetic layer, the third ferromagnetic layer, and the third antiferromagnetic layer. Two ends of the first antiferromagnetic layer and two ends of the first ferromagnetic layer come into contact with only the second antiferromagnetic layer.

Moreover, the second antiferromagnetic layer may comprise one of an X—Mn alloy, α—$Fe_2O_3$, and NiO, wherein X is at least one element selected from among the group consisting of Pt, Pd, Ru, Rh, Ir, and Os, and the third antiferromagnetic layer may comprise an X—Mn alloy wherein X is at least one element selected from among the group consisting of Pt, Pd, Ru, Rh, Ir, and Os.

DESCRIPTION OF THE PREFERRED EMBODIMENTS

An embodiment of a magnetoresistive element of the present invention will be described below with reference to FIG. 1.

Figure 1:
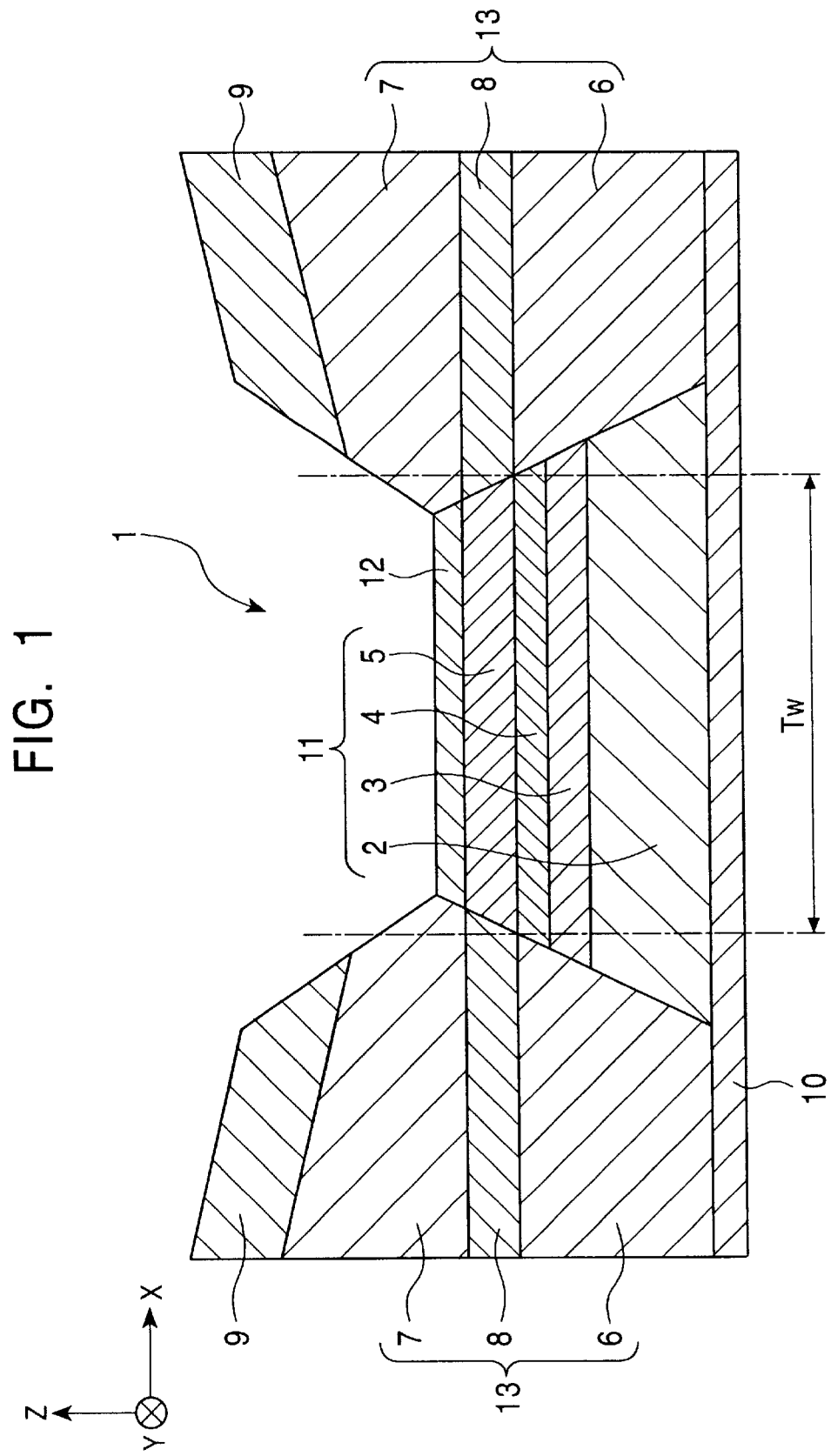
FIG. 1 is a cross-sectional view of a magnetoresistive element according to an embodiment of the present invention.

Referring to FIG. 1, a magnetoresistive element 1 includes an underlayer 10 composed of a nonmagnetic material such as tantalum, a laminate 11 formed on the underlayer 10, and a protective layer 12 composed of a nonmagnetic material such as tantalum formed on the laminate 11. The laminate 11 comprises four layers, namely, a nonmagnetic conductive layer 4, a first ferromagnetic layer 3 formed on one face of the nonmagnetic conductive layer 4, a second ferromagnetic layer 5 formed on the other face of the nonmagnetic conductive layer 4, and a first antiferromagnetic layer 2 formed on the face of the first ferromagnetic layer 3 opposite the face in contact with the first ferromagnetic layer 3. The order of deposition is the first antiferromagnetic layer 2, the first ferromagnetic layer 3, the nonmagnetic conductive layer 4, and the second ferromagnetic layer 5. A bias layer 13 comprising a second antiferromagnetic layer 6, a third ferromagnetic layer 8, and a third antiferromagnetic layer 7 deposited in that order is disposed at each of two ends of the laminate 11, the third ferromagnetic layer 8 coming in contact with the end of the second ferromagnetic layer 5. An electrode layer 9 is formed on each of the bias layers 13.

The first antiferromagnetic layer 2 is made of a PtMn alloy and the like, has a thickness of about 14 nm, and pins the magnetization direction of the first ferromagnetic layer 3.

The first ferromagnetic layer 3 made of a conductive soft-magnetic material such as a CoFe alloy and the like has a thickness of about 3 nm. The magnetization direction of the first ferromagnetic layer 3 is pinned in the Y direction in the drawing, i.e., the direction into the plane of the drawing, as a result of exchange coupling occurring at the interface with the first antiferromagnetic layer 2.

The nonmagnetic conductive layer 4 is made of a nonmagnetic conductive material such as Cu and has a thickness of about 2.2 nm.

The second ferromagnetic layer 5 is made of a conductive soft-magnetic material such as a CoFe alloy or an NiFe alloy and has a thickness of about 3 nm. The whole second ferromagnetic layer 5 is put into a single-magnetic-domain state by the bias magnetic field applied from the third ferromagnetic layer 8 constituting the first ferromagnetic layer 3, and the magnetization direction of the second ferromagnetic layer 5 rotatable in response to the external magnetic field is oriented in the X direction in the drawing which is substantially orthogonal to the magnetization direction of the first ferromagnetic layer 3.

The second and third antiferromagnetic layers 6 and 7 pin the magnetization direction of the third ferromagnetic layer 8 and are made of an alloy containing Mn and at least one element selected from among the group consisting of Pt, Pd, Ru, Rh, Ir, and Os, each having a thickness of about 10 nm to 30 nm. The second and third antiferromagnetic layers 6 and 7 are arranged to oppose each other, and only the second antiferromagnetic layer 6 comes into contact with the ends of the first antiferromagnetic layer 2 and the first ferromagnetic layer 3, preventing the third ferromagnetic layer 8 from coming into contact with the first ferromagnetic layer 3. According to this structure, fluctuation in magnetization direction of the first ferromagnetic layer 3 due to the contact between the first ferromagnetic layer 3 and the third ferromagnetic layer 8 and degradation in the external magnetic field detection characteristics due to the fluctuation can be prevented.

The third ferromagnetic layer 8 is made of a conductive soft-magnetic material such as an NiFe alloy and is disposed between the second and third antiferromagnetic layers 6 and 7. The magnetization direction of the third ferromagnetic layer 8 is pinned in the X direction in the drawing as a result of exchange coupling occurring at the interfaces with the second antiferromagnetic layer 6 and the third antiferromagnetic layer 7. The magnetization direction of the second ferromagnetic layer 5 is oriented in the direction substantially orthogonal to the magnetization direction of the first ferromagnetic layer 3, i.e., the X direction in the drawing, as a result of ferromagnetic coupling (magnetic coupling) between the third ferromagnetic layer 8 and the second ferromagnetic layer 5. In other words, a bias magnetic field is applied from the third ferromagnetic layer 8 constituting the bias layer 13 to the second ferromagnetic layer 5.

The electrode layer 9 supplies a sense current to the first ferromagnetic layer 3, second ferromagnetic layer 5 and the nonmagnetic conductive layer 4, and is made of a nonmagnetic conductive material having a low electrical resistance such as Au, W, Cr, and Ta.

The magnetoresistive element 1 having the above structure is applied to, for example, a magnetic head incorporated in a magnetic disk device. While a sense current (a steady current) is supplied to the first ferromagnetic layer 3, the nonmagnetic conductive layer 4, and the first antiferromagnetic layer 2 from the electrode layer 9 via the bias layer 13, a track width region indicated by Tw is positioned to a desired track on a magnetic disk rotating in the Z direction in the drawing. When a leakage magnetic field from the desired track is applied as an external magnetic field in the Y direction in the drawing, the magnetization direction of the second ferromagnetic layer 5 shifts from the X direction toward the Y direction in the drawing.

Such a change in the magnetization direction of the second ferromagnetic layer 5 in relation to the magnetization direction of the first ferromagnetic layer 3 causes the electrical resistance in the magnetoresistive element 1 to change. The leakage magnetic field from the desired track is then detected as a change in voltage resulting from the change in resistance. Thus, the magnetoresistive element 1 can read the information recorded on the desired track.

In the magnetoresistive element 1, because two ends of the third ferromagnetic layer 8 are magnetically coupled to the second and third antiferromagnetic layers 6 and 7, the magnetization direction of the third ferromagnetic layer 8 is firmly pinned in the X direction in the drawing without having to reduce the thickness of the third ferromagnetic layer 8. Thus, a sufficient bias magnetic field can be applied from the bias layer 13, fluctuation in the magnetization direction of the third ferromagnetic layer 8 due to a leakage magnetic field from the track on a magnetic disk adjacent to the desired track can be securely inhibited, and the information recorded on the desired track can be accurately read.

Because the second and third antiferromagnetic layers 6 and 7 are made of an alloy containing Mn and at least one element selected from among the group consisting of Pt, Pd, Ru, Rh, Ir, and Os, the magnetic coupling between the third ferromagnetic layer 8 and the second and third antiferromagnetic layers 6 and 7 is sufficiently strong, and the magnetization direction of the third ferromagnetic layer 8 can thereby be firmly pinned in the X direction in the drawing.

Alternatively, the second antiferromagnetic layer 6 may be made of an antiferromagnetic insulative oxide such as NiO or $\alpha\text{-Fe}_2\text{O}_3$ instead of the alloy containing Mn and at least one element selected from among the group consisting of Pt, Pd, Ru, Rh, Ir, and Os. A sufficient degree of magnetic coupling can still be achieved between the third ferromagnetic layer 8 and the second and third antiferromagnetic layers 6 and 7.

Figure 2:
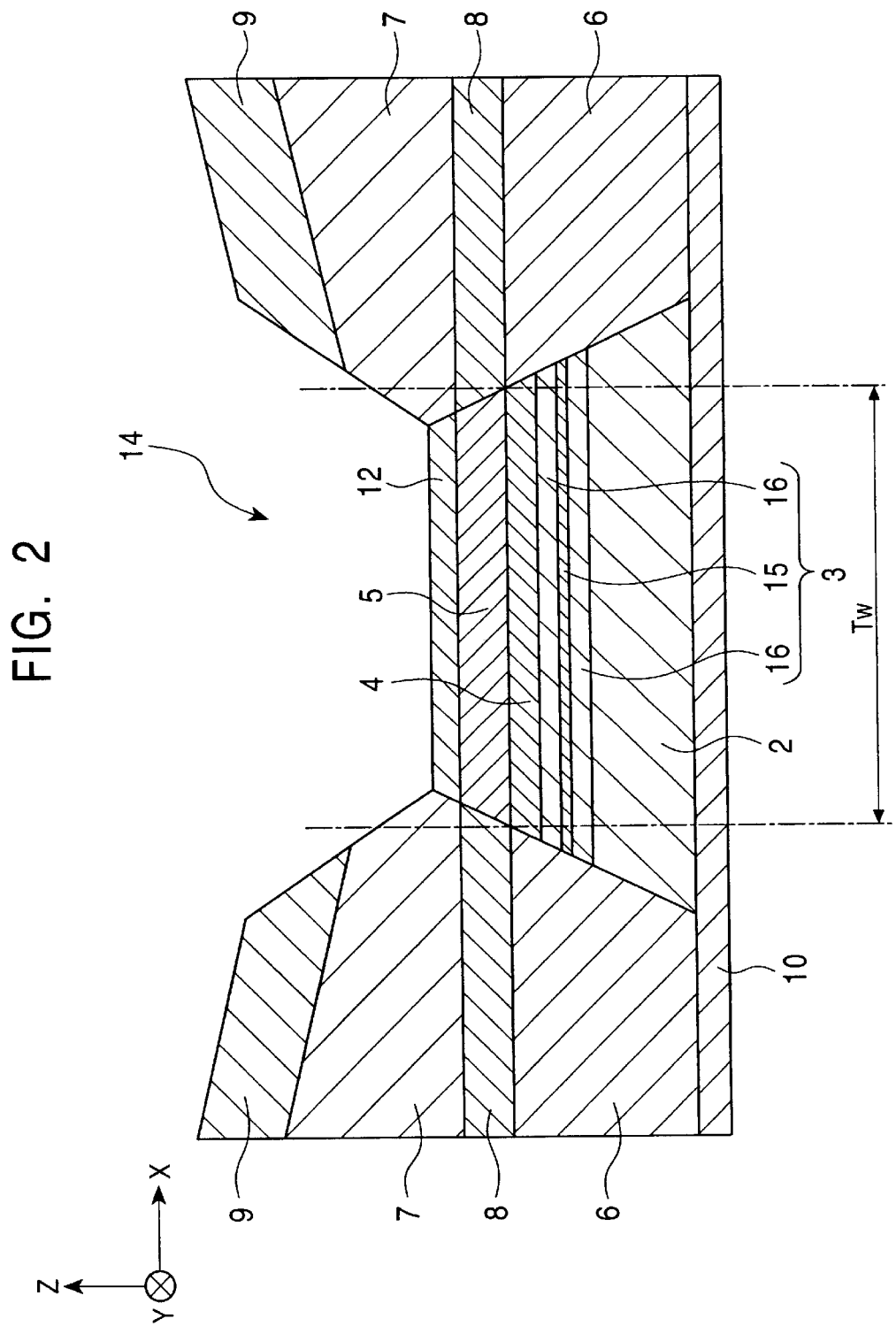
FIG. 2 is a cross-sectional view of a magnetoresistive element according to another embodiment of the present invention.
Figure 3:
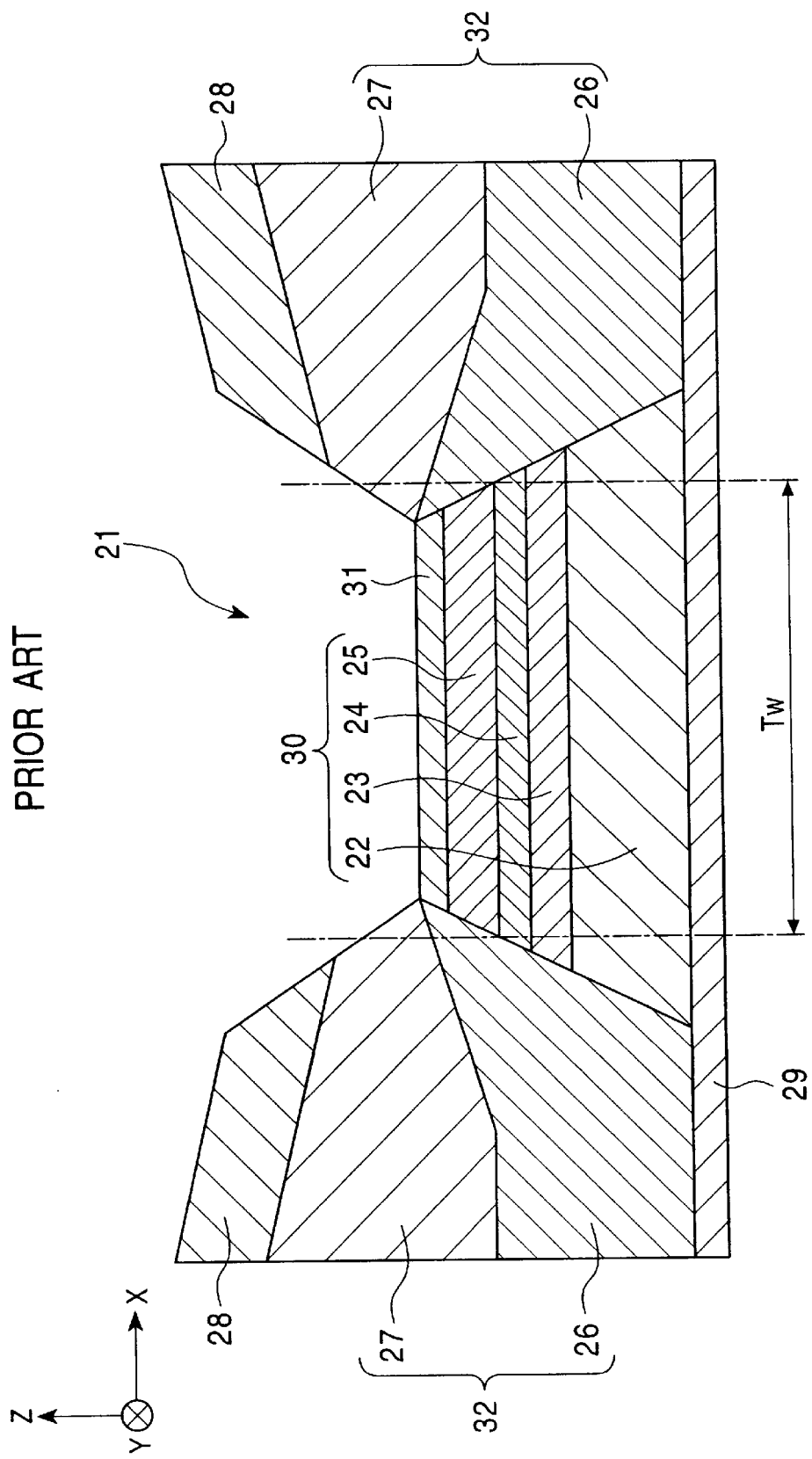
FIG. 3 is a cross-sectional view of a conventional magnetoresistive element.
Figure 4:
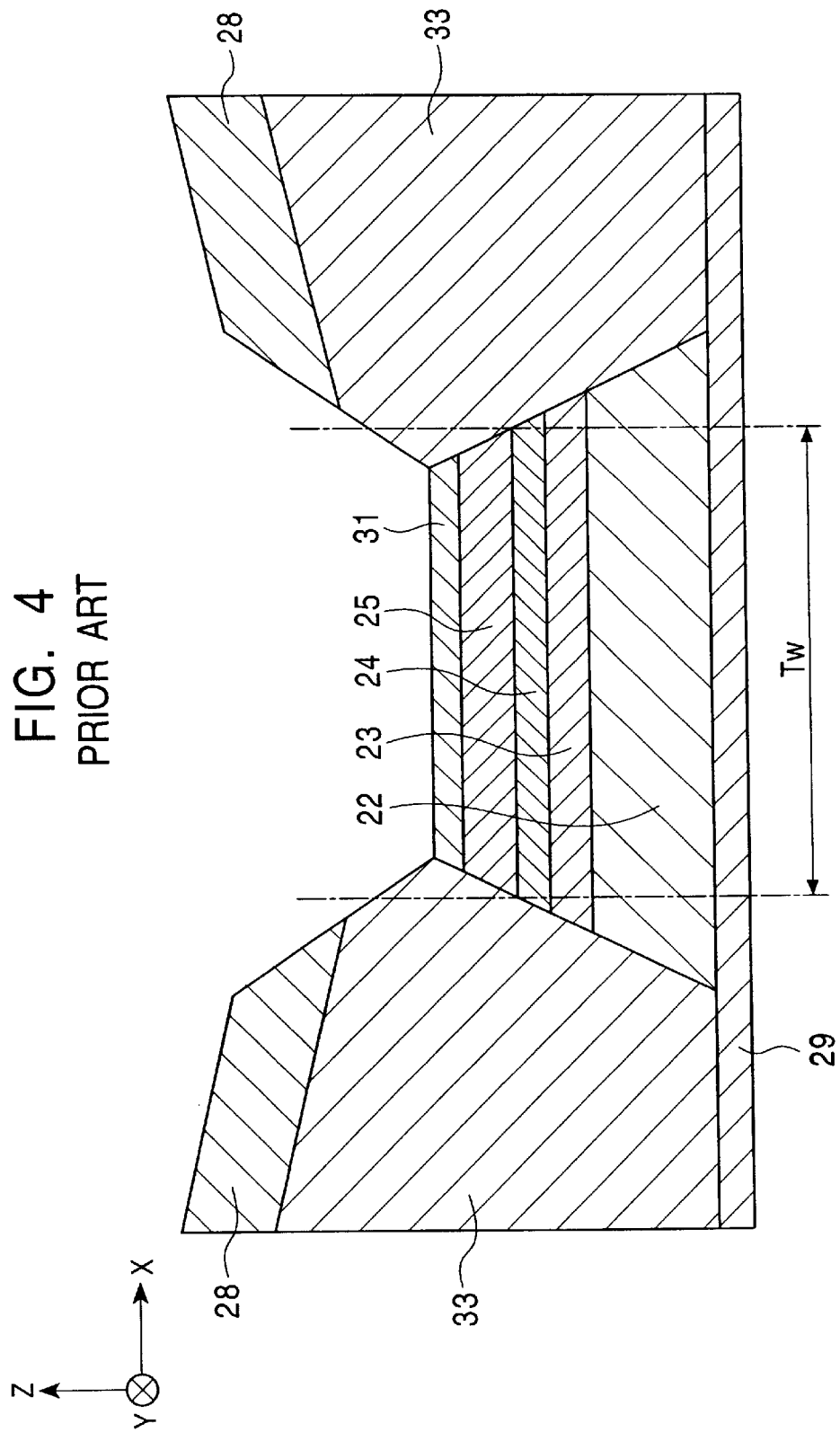
FIG. 4 is a cross-sectional view of another conventional magnetoresistive element.

FIG. 2 illustrates a magnetoresistive element 14 according to another embodiment of the present invention. The structure of the magnetoresistive element 14 is identical to that of the magnetoresistive element 1 described above except for the structure of the first ferromagnetic layer 3. In this embodiment, the first ferromagnetic layer 3 is constituted from a laminate comprising: a nonmagnetic layer 15 made of Ru; and a pair of ferromagnetic layers 16 composed of elemental Co or a CoFe alloy sandwiching the nonmagnetic layer 15.

In the magnetoresistive element 14, the magnetization direction of the first ferromagnetic layer 3 can be further firmly pinned in the Y direction in the drawing, i.e., the direction into the plane of the drawing in FIG. 2, and can be securely arranged to orthogonally intersect the magnetization direction of the nonmagnetic conductive layer 4.

The present invention can be embodied as in the above and has the following advantages.

The magnetoresistive element in accordance with the present invention comprises: a laminate comprising a nonmagnetic conductive layer, a first ferromagnetic layer formed on one face of the nonmagnetic conductive layer, a second ferromagnetic layer formed on the other face of the nonmagnetic conductive layer, and a first antiferromagnetic layer for pinning the magnetization direction of the first ferromagnetic layer. The first antiferromagnetic layer is formed on the face of the first ferromagnetic layer opposite the face in contact with the nonmagnetic conductive layer. The magnetoresistive element also comprises bias layers for applying a bias magnetic field to the second ferromagnetic layer in order to orient the magnetization direction of the second ferromagnetic layer in a direction substantially orthogonal to the magnetization direction of the first ferromagnetic layer. The bias layers are respectively disposed on the two ends of the laminate. The bias layer comprises a second antiferromagnetic layer and a third antiferromagnetic layer arranged to oppose each other and a third ferromagnetic layer for generating the bias magnetic field by magnetically coupling to the second and the third antiferromagnetic layers. The third ferromagnetic layer is disposed between the second and third antiferromagnetic layers. Because two ends of the second ferromagnetic layer come into contact with the third ferromagnetic layer, the magnetization direction of the third ferromagnetic layer can be further firmly pinned without reducing the thickness of the third magnetic layer to the thickness smaller than that of the second ferromagnetic layer. Thus, the magnetization direction of the third ferromagnetic layer can be further firmly pinned, a sufficient bias magnetic field can be generated from the bias layers, and a magnetoresistive element exhibiting superior external magnetic field detection characteristics can be achieved.

Moreover, the laminate is formed by depositing the first antiferromagnetic layer, the first ferromagnetic layer, the nonmagnetic conductive layer, and the second ferromagnetic layer, in that order. The bias layer is formed by depositing the second antiferromagnetic layer, the third ferromagnetic layer, and the third antiferromagnetic layer, in that order. Since two ends of the first antiferromagnetic layer and two ends of the first ferromagnetic layer come into contact with only the second antiferromagnetic layer, fluctuation in the magnetization direction of the first ferromagnetic layer due to the contact between the first ferromagnetic layer and the third ferromagnetic layer can be prevented, and degradation in the external magnetic field detection characteristics resulting from the fluctuation can be prevented.

Since the second antiferromagnetic layer is made of an X—Mn alloy, $\alpha\text{-Fe}_2\text{O}_3$, or NiO, wherein X is at least one selected from among the group consisting of Pt, Pd, Ru, Rh, Ir, and Os, and the third antiferromagnetic layer is made of an X—Mn alloy, wherein X is at least one selected from among the group consisting of Pt, Pd, Ru, Rh, Ir, and Os, a sufficiently strong magnetic coupling between the third ferromagnetic layer and the second and third antiferromagnetic layer can be achieved, and the magnetization direction of the third ferromagnetic layer can be firmly pinned.

What is claimed is:

1. A magnetoresistive element comprising:
   a laminate comprising a nonmagnetic conductive layer, a first ferromagnetic layer formed on one face of the nonmagnetic conductive layer, a second ferromagnetic layer formed on the other face of the nonmagnetic conductive layer, and a first antiferromagnetic layer to pin a magnetization direction of the first ferromagnetic layer, the first antiferromagnetic layer being formed on a face of the first ferromagnetic layer opposite a face of the first ferromagnetic layer in contact with the nonmagnetic conductive layer; and
   bias layers to apply a bias magnetic field to the second ferromagnetic layer to orient a magnetization direction of the second ferromagnetic layer in a direction substantially orthogonal to the magnetization direction of the first ferromagnetic layer, the bias layers being respectively disposed on two ends of the laminate, wherein each of the bias layers comprises a second antiferromagnetic layer and a third antiferromagnetic layer arranged to oppose each other, and a third ferromagnetic layer to generate the bias magnetic field by magnetically coupling to the second and third antiferromagnetic layers, the third ferromagnetic layer being disposed between the second and third antiferromagnetic layers, and wherein each end of the second ferromagnetic layer comes in contact with one of the third ferromagnetic layers.

2. A magnetoresistive element according to claim 1, wherein the first antiferromagnetic layer, the first ferromagnetic layer, the nonmagnetic conductive layer, and the second ferromagnetic layer are deposited in that order in the laminate, wherein the second antiferromagnetic layer, the third ferromagnetic layer and the third antiferromagnetic layer are deposited in that order in each of the bias layers, and wherein ends of the first antiferromagnetic layer and ends of the first ferromagnetic layer come into contact with only the second antiferromagnetic layers.

3. A magnetoresistive element according to claim 1, wherein each second antiferromagnetic layer comprises one of an X—Mn alloy, $\alpha$-$Fe_2O_3$, and NiO, wherein X is at least one element selected from among the group consisting of Pt, Pd, Ru, Rh, Ir, and Os, and wherein each third antiferromagnetic layer comprises a Y—Mn alloy wherein Y is at least one element selected from among the group consisting of Pt, Pd, Ru, Rh, Ir, and Os.

* * * * *